US012810107B2

(12) United States Patent
Chen et al.

(10) Patent No.: US 12,810,107 B2
(45) Date of Patent: Nov. 24, 2026

(54) SYSTEM FOR GENERATING NATURAL LANGUAGE COMMENT TEXTS FOR MULTI-VARIATE TIME SERIES

(71) Applicant: NEC Laboratories America, Inc., Princeton, NJ (US)

(72) Inventors: Yuncong Chen, Plainsboro, NJ (US); Cristian Lumezanu, Princeton Junction, NJ (US); Wei Cheng, Princeton Junction, NJ (US); Takehiko Mizoguchi, West Windsor, NJ (US); Masanao Natsumeda, Princeton Junction, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 1273 days.

(21) Appl. No.: 17/711,553

(22) Filed: Apr. 1, 2022

(65) Prior Publication Data

US 2022/0318593 A1 Oct. 6, 2022

Related U.S. Application Data

(60) Provisional application No. 63/170,663, filed on Apr. 5, 2021.

(51) Int. Cl.
*G06F 40/284* (2020.01)
*G06N 3/04* (2023.01)
(Continued)

(52) U.S. Cl.
CPC ............. *G06N 3/04* (2013.01); *G06F 40/284* (2020.01); *G06N 3/063* (2013.01); *G06N 3/08* (2013.01)

(58) Field of Classification Search
CPC . G06N 3/04; G06N 3/063; G06N 3/08; G06F 40/284
See application file for complete search history.

(56) References Cited

U.S. PATENT DOCUMENTS

| | | | | |
|---|---|---|---|---|
| 2019/0378506 A1* | 12/2019 | Garikapati | .............. | G10L 15/22 |
| 2020/0034436 A1* | 1/2020 | Chen | ...................... | G06N 3/044 |
| 2020/0380074 A1* | 12/2020 | Li | .......................... | G06N 20/00 |

OTHER PUBLICATIONS

Edunov, S., Ott, M., Auli, M., & Grangier, D. (2018). Understanding Back-Translation at Scale. In Proceedings of the 2018 Conference on Empirical Methods in Natural Language Processing (pp. 489-500).

(Continued)

*Primary Examiner* — Ben M Rifkin
(74) *Attorney, Agent, or Firm* — Vincent Duffy

(57) ABSTRACT

A method for explaining sensor time series data in natural language is presented. The method includes training a neural network model with text-annotated time series data, the neural network model including a time series encoder and a text generator, allowing a human operator to select a time series segment from the text-annotated time series data, the time series segment processed by the time series encoder, outputting, from the time series encoder, a sequence of hidden state vectors, one for each timestep, and generating readable explanatory texts for the human operator based on the selected time series segment, the readable explanatory texts being a set of comment texts explaining and interpret-ing the selected time series segment in a plurality of different ways.

20 Claims, 9 Drawing Sheets

410

(51) Int. Cl.
*G06N 3/063* (2023.01)
*G06N 3/08* (2023.01)

(56) References Cited

OTHER PUBLICATIONS

Kudo, T. and Richardson, J., 2018, November. SentencePiece: A simple and language independent subword tokenizer and detokenizer for Neural Text Processing. In Proceedings of the 2018 Conference on Empirical Methods in Natural Language Processing: System Demonstrations (pp. 66-71).

Qin, Y., Song, D., Cheng, H., Cheng, W., Jiang, G. and Cottrell, G.W., 2017, August. A dual-stage attention-based ecurrent neural network for time series prediction. In Proceedings of the 26th lnternational Joint Conference on rtiticial Intelligence (pp. 2627-2633).

Vaswani, A., Shazeer, N., Parmar, N., Uszkoreit, J., Jones, L., Gomez, A.N., Kaiser, Ł. and Polosukhin, I., 2017, ecember. Attention is all you need. In Proceedings of the 31st International Conference on Neural Information rocessing Systems (pp. 6000-6010).

* cited by examiner

SYSTEM FOR GENERATING NATURAL LANGUAGE COMMENT TEXTS FOR MULTI-VARIATE TIME SERIES

RELATED APPLICATION INFORMATION

This application claims priority to Provisional Application No. 63/170,663, filed on Apr. 5, 2021, the contents of which are incorporated herein by reference in their entirety.

BACKGROUND

Technical Field

The present invention relates to time series data and, more particularly, to a system for generating natural language comments texts for multi-variate time series data.

Description of the Related Art

Time series data are prevalent in the big-data era. One example pertains to industrial monitoring where many sensor streams constitute complex time series. Modern data analytics software train machine learning models to detect and classify time series patterns. However, to an average operator untrained in data analysis, the results from such software is not as readable or comprehensible as natural language comments from human experts. This lack of a more natural form of analysis feedback has hindered wider adaptation of industrial analytics in the field.

Meanwhile in many scenarios, facilities acquire large amounts of time series data tagged with human-written free-form comment texts as part of their maintenance and operation program. For example, a power plant operator noticing an anomaly from a sensor may record text notes describing the current equipment condition, problems found by inspection, potential root causes, solutions and expected future condition progression. From such logs and the data historian software (time series database), a user can extract paired data in two modalities, that is, time series segments and corresponding natural language texts. Using such data, the domain-specific correlations between time series and texts can be learned to facilitate time series understanding and staff training. Despite the obvious value of such multi-modal data (in particular the high time and labor cost of acquiring them) and the benefit of learning the time series-text correlation, no system currently exists to utilize these data.

SUMMARY

A method for explaining sensor time series data in natural language is presented. The method includes training a neural network model with text-annotated time series data, the neural network model including a time series encoder and a text generator, allowing a human operator to select a time series segment from the text-annotated time series data, the time series segment processed by the time series encoder, outputting, from the time series encoder, a sequence of hidden state vectors, one for each timestep, and generating readable explanatory texts for the human operator based on the selected time series segment, the readable explanatory texts being a set of comment texts explaining and interpreting the selected time series segment in a plurality of different ways.

A non-transitory computer-readable storage medium comprising a computer-readable program for explaining sensor time series data in natural language is presented. The computer-readable program when executed on a computer causes the computer to perform the steps of training a neural network model with text-annotated time series data, the neural network model including a time series encoder and a text generator, allowing a human operator to select a time series segment from the text-annotated time series data, the time series segment processed by the time series encoder, outputting, from the time series encoder, a sequence of hidden state vectors, one for each timestep, and generating readable explanatory texts for the human operator based on the selected time series segment, the readable explanatory texts being a set of comment texts explaining and interpreting the selected time series segment in a plurality of different ways.

A system for explaining sensor time series data in natural language is presented. The system includes a memory and one or more processors in communication with the memory configured to train a neural network model with text-annotated time series data, the neural network model including a time series encoder and a text generator, allow a human operator to select a time series segment from the text-annotated time series data, the time series segment processed by the time series encoder, output, from the time series encoder, a sequence of hidden state vectors, one for each timestep, and generate readable explanatory texts for the human operator based on the selected time series segment, the readable explanatory texts being a set of comment texts explaining and interpreting the selected time series segment in a plurality of different ways.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The exemplary embodiments of the present invention utilize text-annotated time series data (e.g., obtained from maintenance records) to train a neural network model that generates readable and accurate explanatory texts given a time series segment (e.g., from Internet of Things (IoT) sensor streams). The goal is to facilitate data understanding and decision making for human operators who do not have data science expertise.

First, a dataset including pairs of time series segments and free-form comment texts is used to train the model. The time series can be either univariate or multi-variate. Then, at test time, the trained model takes a potentially unseen time series as input and generates texts that can be used as interpretation or explanation of the input. The user can run the model repeatedly, and each time the model generates a different text, explaining and/or interpreting the input in a multitude of different ways. An example usage of this system is in FIG. 1.

Figure 1:
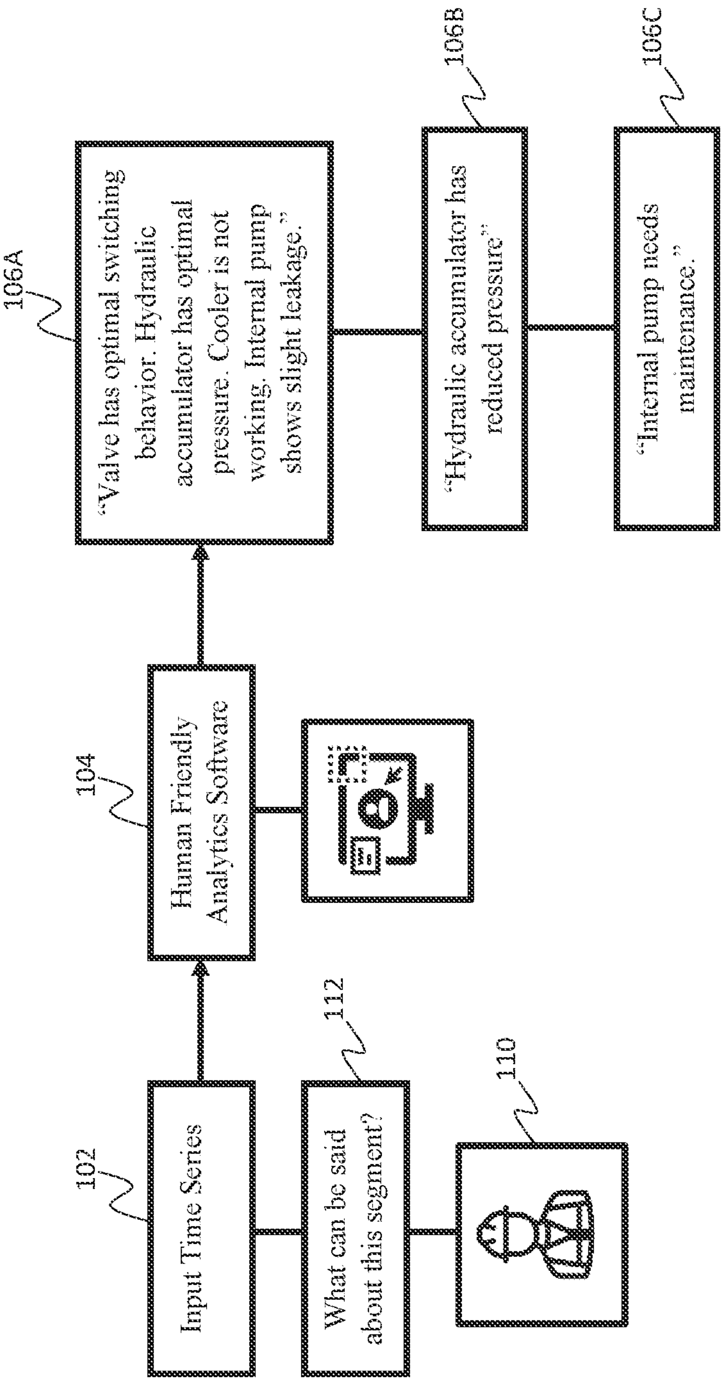
FIG. 1 is a block/flow diagram of an exemplary system for explaining sensor time series data in natural language, in accordance with embodiments of the present invention.

FIG. 1 is a use case of the proposed software system for explaining sensor time series in natural language. In this example, a user 110 selects a multi-variate time series segment 102 in need of explanation. The user 110 can ask a question 112 such as, what can be said about this segment? The system 104 generates a set of comment texts 106A, 106B, 106C for the given or selected time series 102. Several different types of texts can be output based on different interpretations of the input time series 102.

Figure 2:
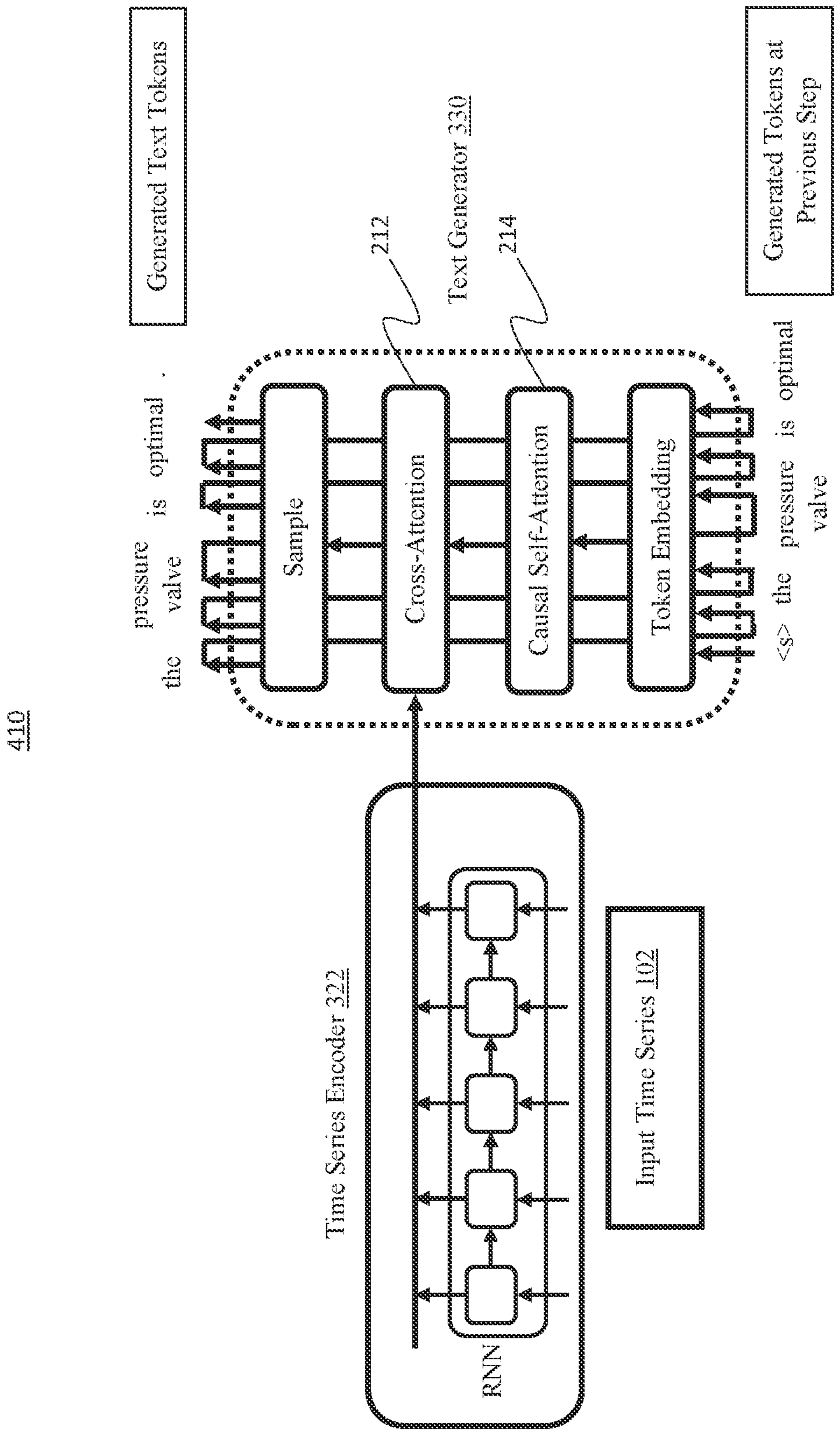
FIG. 2 is a block/flow diagram of an exemplary network architecture for time series to comment text generation, in accordance with embodiments of the present invention.

FIG. 2 illustrates a network architecture, where the model 410 includes a time series encoder 322 and a text generator 330. The time series encoder 322 can be implemented as a recurrent neural network (RNN), a transformer or any sequence model. The time series encoder 322 takes the time series segment that the user 110 queries as input and outputs a sequence of hidden state vectors, one for each timestep. The text generator 330 is a stack of transformer layers, with causal self-attention layer 214 and cross-attention layer 212. The text generator 330 takes a complete or partial sequence of tokens as input, and through dynamic decoding and sampling, generates a token sequence that is joined or assembled to form a complete text string.

With further reference to FIG. 2, the time series encoder 322 can be, e.g., an RNN. The transformer-based text generator 330 generates a token at every step. The generated token at the current step is used as the input at the next step. The cross-attention layer 212 attends to the hidden states from the time series encoder 322.

Previous works focused on either time series classification or text generation. The exemplary embodiments of the present invention address the time series-to-text generation task in an end-to-end manner, tackling both sub-tasks jointly in a single model.

Therefore, the exemplary embodiments of the present invention provide for:

A neural network-based time series to comment text generation system to make the feedback of time series analytics software more friendly to field users without data analysis expertise. The multivariate time series encoder model captures important or beneficial features of the time series that need explanation or interpretation. The transformer-based text generator 330 employs the causal self-attention layer 214 and the cross-attention layer 212 to generate accurate readable explanation text or comments.

Moreover, back-translation is used to obtain rephrased texts to augment the dataset of time series-text pairs. The causal self-attention mechanism allows visualizing the influence of previously generated tokens on subsequent generation. The causal self-attention mechanism facilitates model sanity checking and the learning of multi-token terms. The cross-attention mechanism allows visualizing the influence of time series steps on the text generation process and improves robustness to extraneous spans in the time series segments.

Additionally, a mixture of teacher forcing and free running modes is employed in training the text generator to improve generation quality. A dynamic decoding and sampling procedure is employed for generating a diverse set of explanation texts or comments.

Regarding data preparation, a dataset of n pairs of time series segments is acquired and free-form comment text in English is obtained. The i'th data pair is denoted by $(x^{(i)}, y^{(i)})$ where $x^{(i)}$ is the time series segment and $y^{(i)}$ is the text. The time series can include more than one variable. Each time series is normalized by the minimum and maximum values to range between 0 and 1. The set of available text is augmented by back-translation. Each text is translated to a foreign language and then translated back to English using a machine translation tool such as Google Translate. The resulting text will have the same meaning as the original text but will likely use different words. Using K foreign languages, each text is converted to K rephrased texts with identical semantics. Each rephrased text is associated with the time series to form a new data pair. Each text is tokenized into a token sequence using a tokenizer such as SentencePiece. A start-of-text symbol <s> is inserted at the beginning of the text, and an end-of-text symbol </s> is appended to the end of the text.

SentencePiece is a language-independent subword tokenizer and detokenizer designed for neural-based text processing, including neural machine translation. SentencePiece provides open-source C++ and Python implementations for subword units. SentencePiece can train subword models directly from raw sentences, which allows one to make a purely end-to-end and language independent system.

Regarding the network model architecture, as noted above, the model 410 includes a time series encoder 322 and a text generator 330. The time series encoder 322 can be implemented as an RNN, a transformer or any sequence model. One possible implementation is a dual-attention RNN for multivariate input series. The time series encoder 322 takes the input time series 102 and at each timestep outputs a hidden state vector that summarizes the accumulated information at each timestep of the time series 102.

The text generator 330 is a stack of transformer layers. The input to the text generator 330 is a complete or partial sequence of tokens. At each position, the embedding of the input token is looked up and passed forward to the causal self-attention layer 214. The causal self-attention layer 214 transforms the embedding vector using a dynamically selected set of hidden states that are before the current position. The cross-attention layer 212 further applies a transformation using a dynamically selected set of time series encoder hidden states. A subsequent projection layer generates a probability distribution over all tokens in the vocabulary. According to this distribution, a text token is sampled as the output at the current position.

Regarding training, the neural network 410 is trained end-to-end in iterations. At each training iteration, a batch of paired data is sampled, and the total token-wise cross entropy loss is computed. At each position, the cross entropy between the generated token probability distribution and the true token from the training text is computed. It is summed up over each sequence and over the data batch. Stochastic gradient descent can be used to update the network parameters and minimize the total loss.

A mixture of teacher-forcing and free-running training modes is used to improve the generation quality. After the text generator outputs each token, the exemplary methods randomly choose one of these two modes to determine the input at the next position. In the teacher forcing mode, the input at the next position is the true token at that position in the training text. In the free-running mode, a token is sampled from the vocabulary according to the output distribution of the current position and used as the input at the next position.

Regarding testing, in test time, a time series segment that the user wants explanation for is passed through the neural network 410. The initial input to the text generator 330 is the start-of-text symbol <s>. Free-running mode is used and the sampled output token at each position is used as the input for the next position. This dynamic decoding process repeats until a </s> symbol is generated. The generated token sequence is joined or assembled to form a text string that will be returned to the user. Repeated samplings can generate a diverse set of texts.

Figure 3:
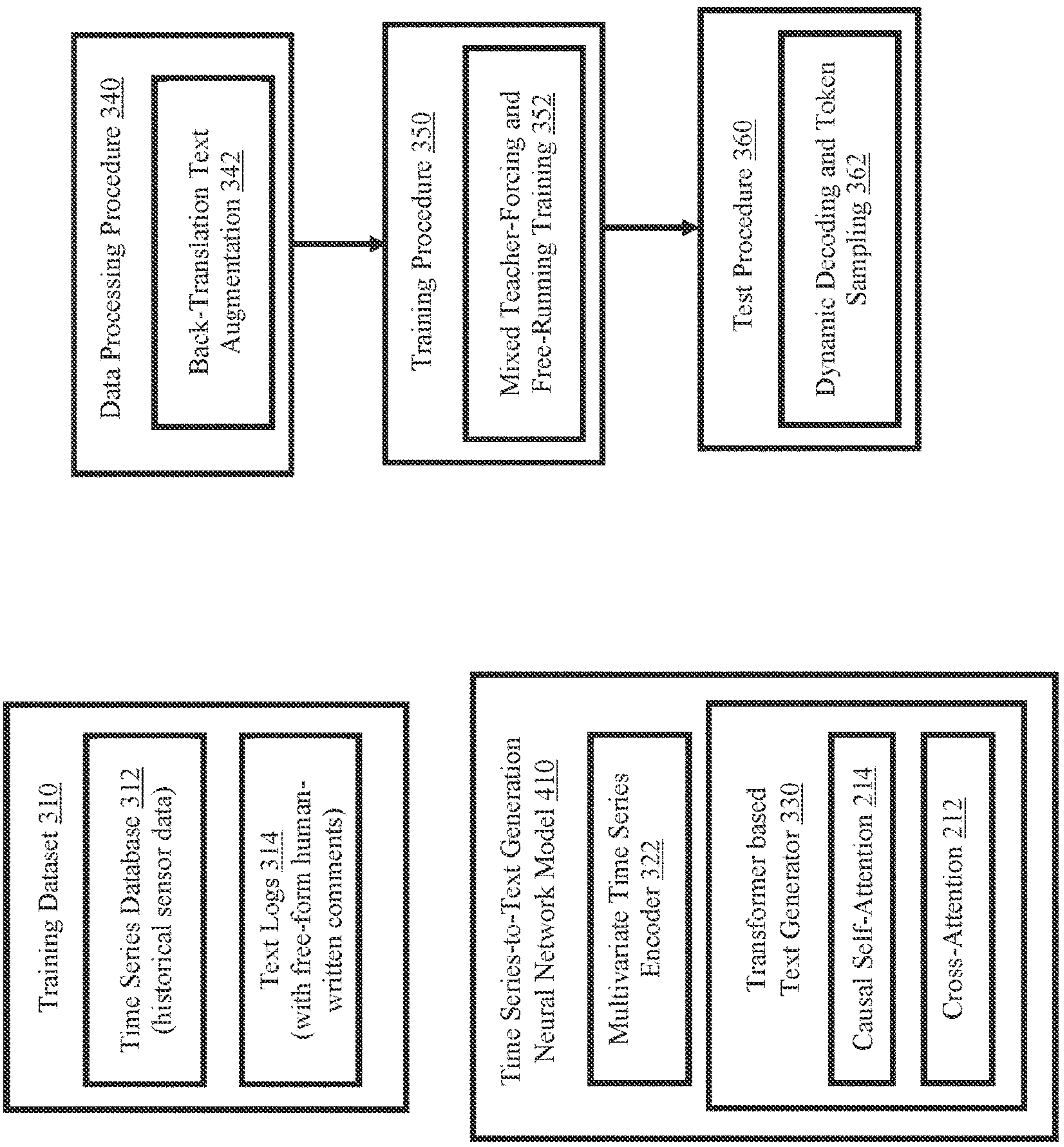
FIG. 3 is a block/flow diagram illustrating components of the system for explaining sensor time series data in natural language, in accordance with embodiments of the present invention.

FIG. 3 is a block/flow diagram illustrating components of the system for explaining sensor time series in natural language, in accordance with embodiments of the present invention.

The training dataset 310 includes a time series database 312 and text logs 314. The time series database 312 includes historical sensor data whereas the text logs 314 include free-form human-written comments.

The time series-to-text generation neural network model 410 includes a multivariate time series encoder 322, as well as a transformer-based text generator 330 having at least a causal self-attention layer 214 and a cross-attention layer 212.

A data processing procedure 340 includes a back-translation text augmentation module 342.

The training procedure 350 includes a mixed teacher-forcing and free-running training module 352.

The test procedure 360 includes a dynamic decoding and token sampling module 362.

Figure 4:
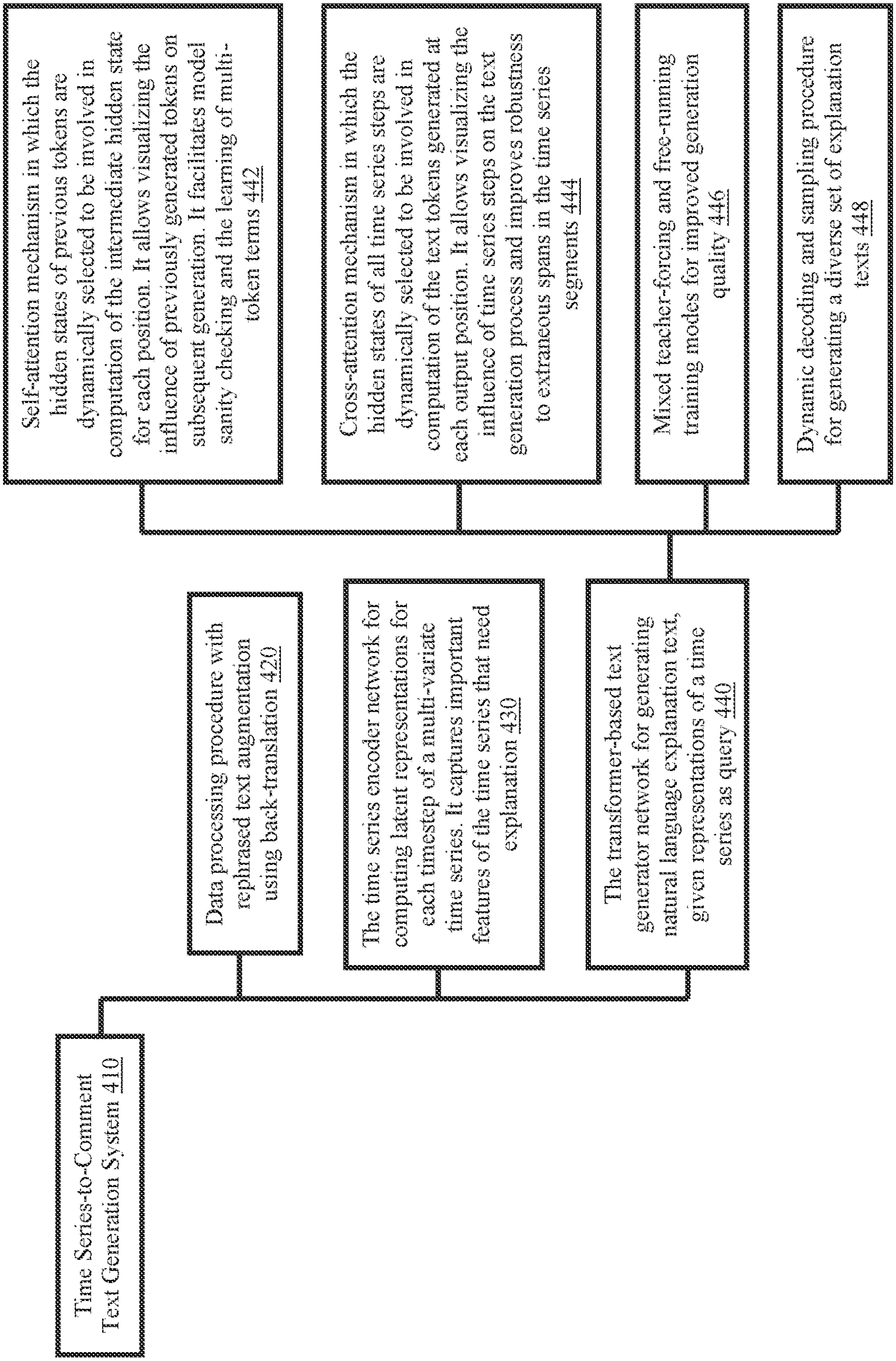
FIG. 4 is a block/flow diagram illustrating features of the system for explaining sensor time series data in natural language, in accordance with embodiments of the present invention.

FIG. 4 is a block/flow diagram illustrating features of the system for explaining sensor time series in natural language, in accordance with embodiments of the present invention.

The time series-to-comment text generation system 410 includes a data processing procedure with rephrased text augmentation using back-translation 420 and the time series encoder network for computing latent representations for each timestep of a multi-variate time series. It captures important features of the time series that need explanation 430. The time series-to-comment text generation system 410 further includes the transformer-based text generator network for generating natural language explanation text, given representations of a time series as query 440.

The transformer-based text generator network 440 includes a self-attention mechanism 442 in which the hidden states of previous tokens are dynamically selected to be involved in computation of the intermediate hidden state for each position. The self-attention mechanism allows visualizing the influence of previously generated tokens on subsequent generation. The self-attention mechanism facilitates model sanity checking and the learning of multi-token terms.

The transformer-based text generator network 440 further includes a cross-attention mechanism 444 in which the hidden states of all time series steps are dynamically selected to be involved in computation of the text tokens generated at each output position. The cross-attention mechanism allows visualizing the influence of time series steps on the text generation process and improves robustness to extraneous spans in the time series segments.

The transformer-based text generator network 440 further includes mixed teacher-forcing and free-running training modes 446 for improved generation quality.

The transformer-based text generator network 440 further includes a dynamic decoding and sampling procedure 448 for generating a diverse set of explanation texts.

Figure 5:
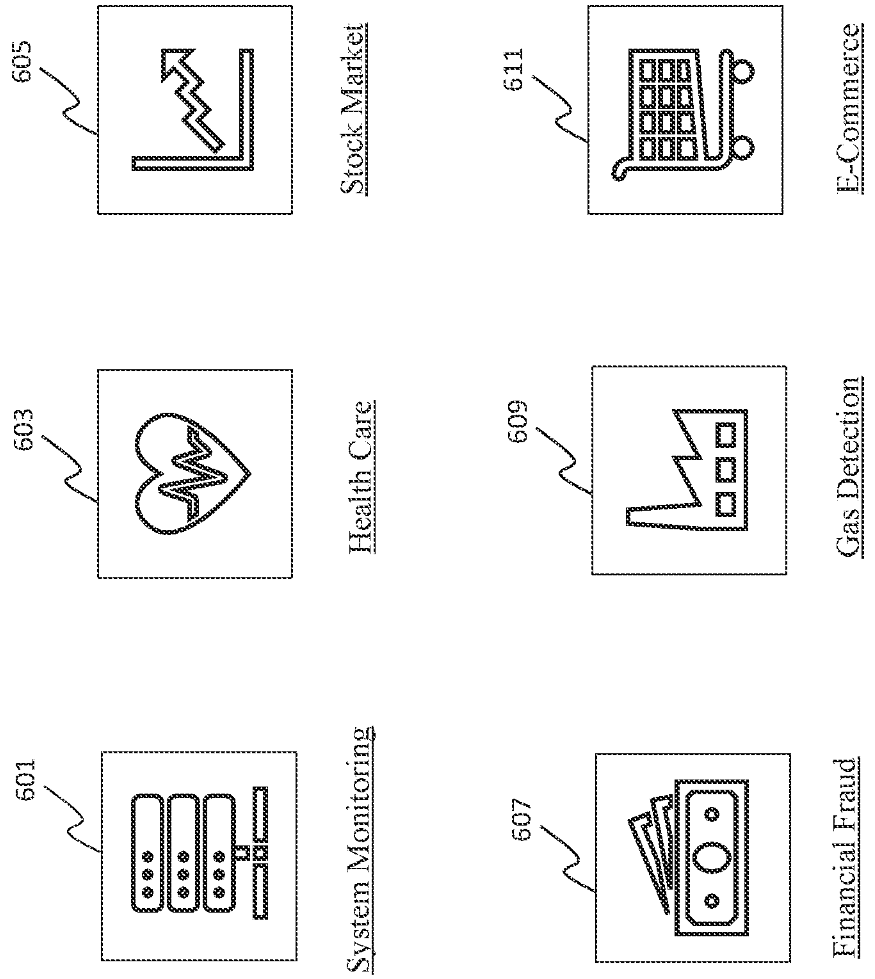
FIG. 5 is a block/flow diagram of an exemplary practical application for explaining sensor time series data in natural language, in accordance with embodiments of the present invention.

FIG. 5 is a block/flow diagram of an exemplary practical application for explaining sensor time series in natural language, in accordance with embodiments of the present invention.

Practical applications for learning and forecasting trends in multivariate time series data can include, but are not limited to, system monitoring 601, healthcare 603, stock market data 605, financial fraud 607, gas detection 609, and e-commerce 611. The time-series data in such practical applications can be collected by sensors 710 (FIG. 6).

Figure 6:
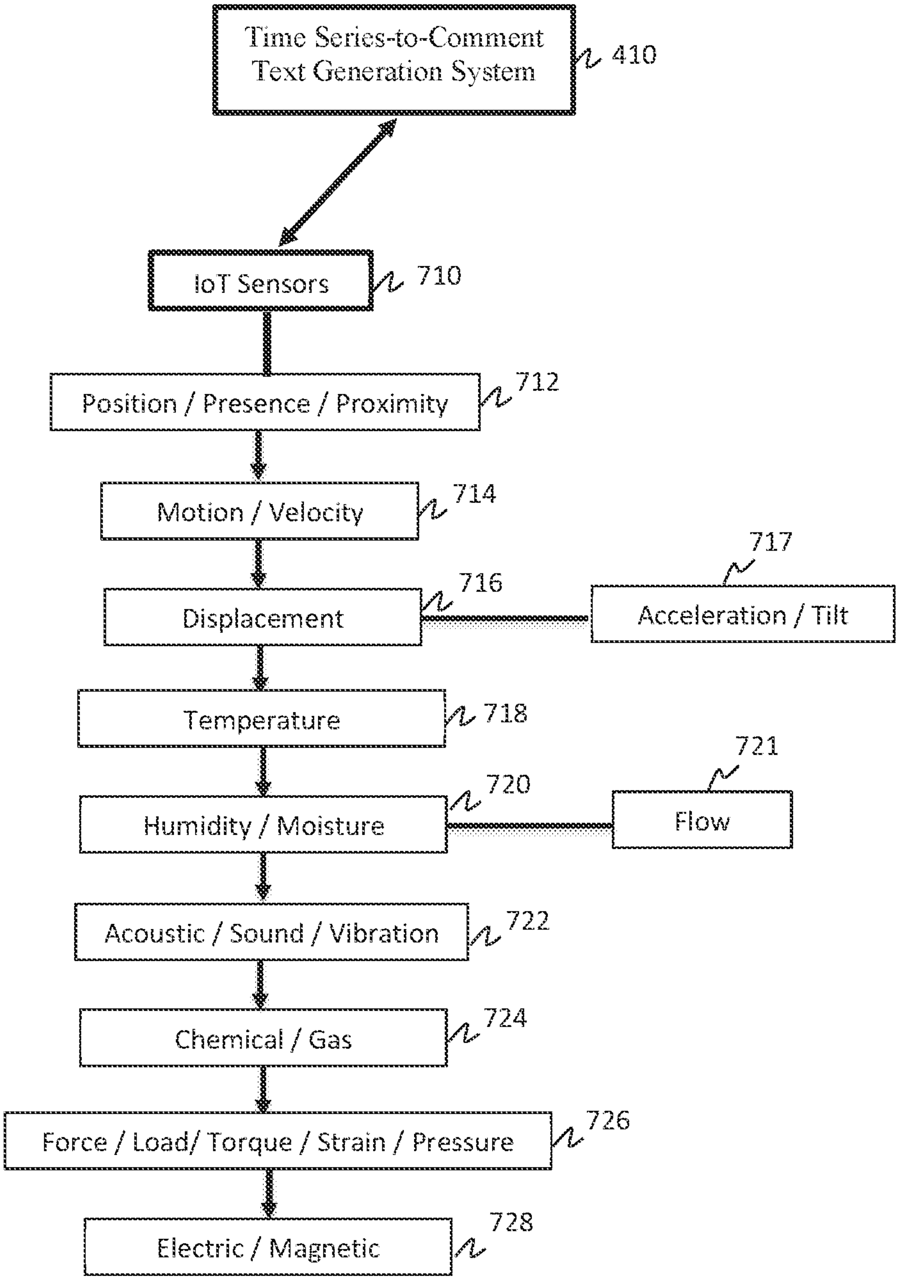
FIG. 6 is a block/flow diagram of exemplary Internet-of-Things (IoT) sensors used to collect data/information for explaining sensor time series data in natural language, in accordance with embodiments of the present invention.

FIG. 6 is a block/flow diagram of exemplary Internet-of-Things (IoT) sensors used to collect data/information for explaining sensor time series in natural language, in accordance with embodiments of the present invention.

IoT loses its distinction without sensors. IoT sensors act as defining instruments which transform IoT from a standard passive network of devices into an active system capable of real-world integration.

The IoT sensors 710 can communicate with the time series-to-comment text generation system 410 for explaining sensor time series in natural language to process information/data, continuously and in in real-time. Exemplary IoT sensors 710 can include, but are not limited to, position/presence/proximity sensors 712, motion/velocity sensors 714, displacement sensors 716, such as acceleration/tilt sensors 717, temperature sensors 718, humidity/moisture sensors 720, as well as flow sensors 721, acoustic/sound/vibration sensors 722, chemical/gas sensors 724, force/load/torque/strain/pressure sensors 726, and/or electric/magnetic sensors 728. One skilled in the art can contemplate using any combination of such sensors to collect data/information for input into the time series-to-comment text generation system 410 for explaining sensor time series in natural language. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover, data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

Figure 7:
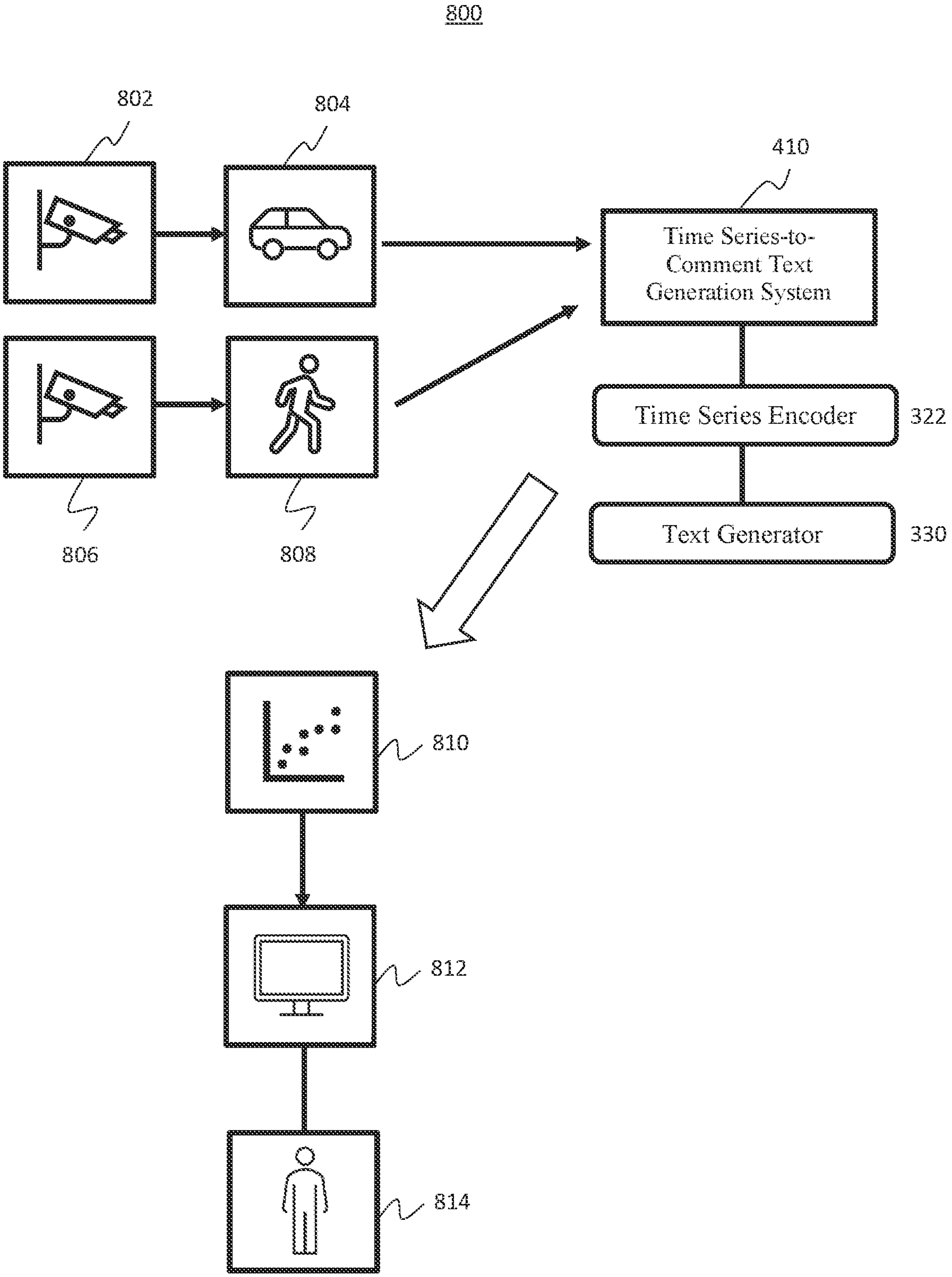
FIG. 7 is an exemplary practical application for explaining sensor time series data in natural language, in accordance with embodiments of the present invention.

FIG. 7 is a block/flow diagram 800 of a practical application for explaining sensor time series in natural language, in accordance with embodiments of the present invention.

In one practical example, a first camera 802 detects an object, such as a vehicle 804 and a second camera 806 detects an object, such as a person 808. The objects 804, 808 are processed by the time series-to-comment text generation system 410 for explaining sensor time series in natural language. The results 810 (e.g., variables or parameters or factors or features or text or comment text or explanations or interpretations) can be provided or displayed on a user interface 812 handled by a user 814.

Figure 8:
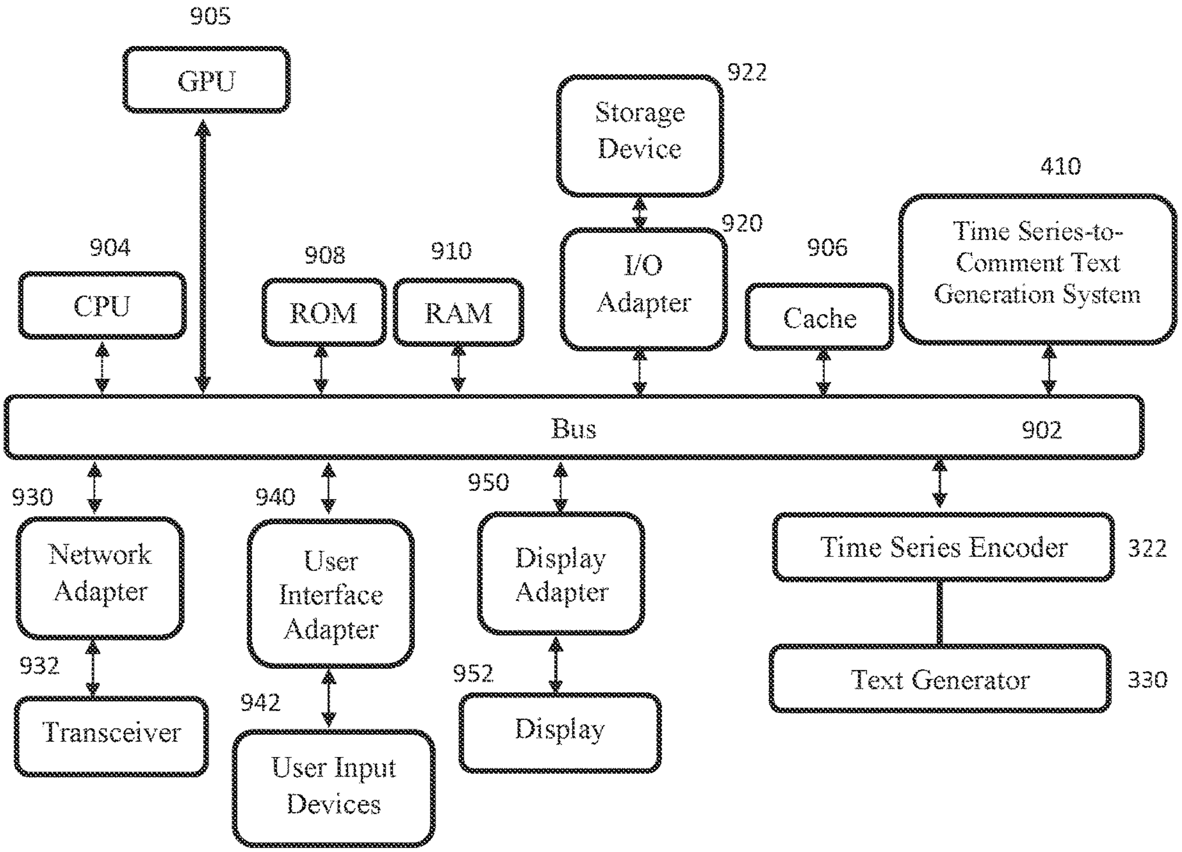
FIG. 8 is an exemplary processing system for explaining sensor time series data in natural language, in accordance with embodiments of the present invention.

FIG. 8 is an exemplary processing system for explaining sensor time series in natural language, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the time series-to-comment text generation system 410 for explaining sensor time series in natural language can be employed via a time series encoder 322 and a text generator 330.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 9:
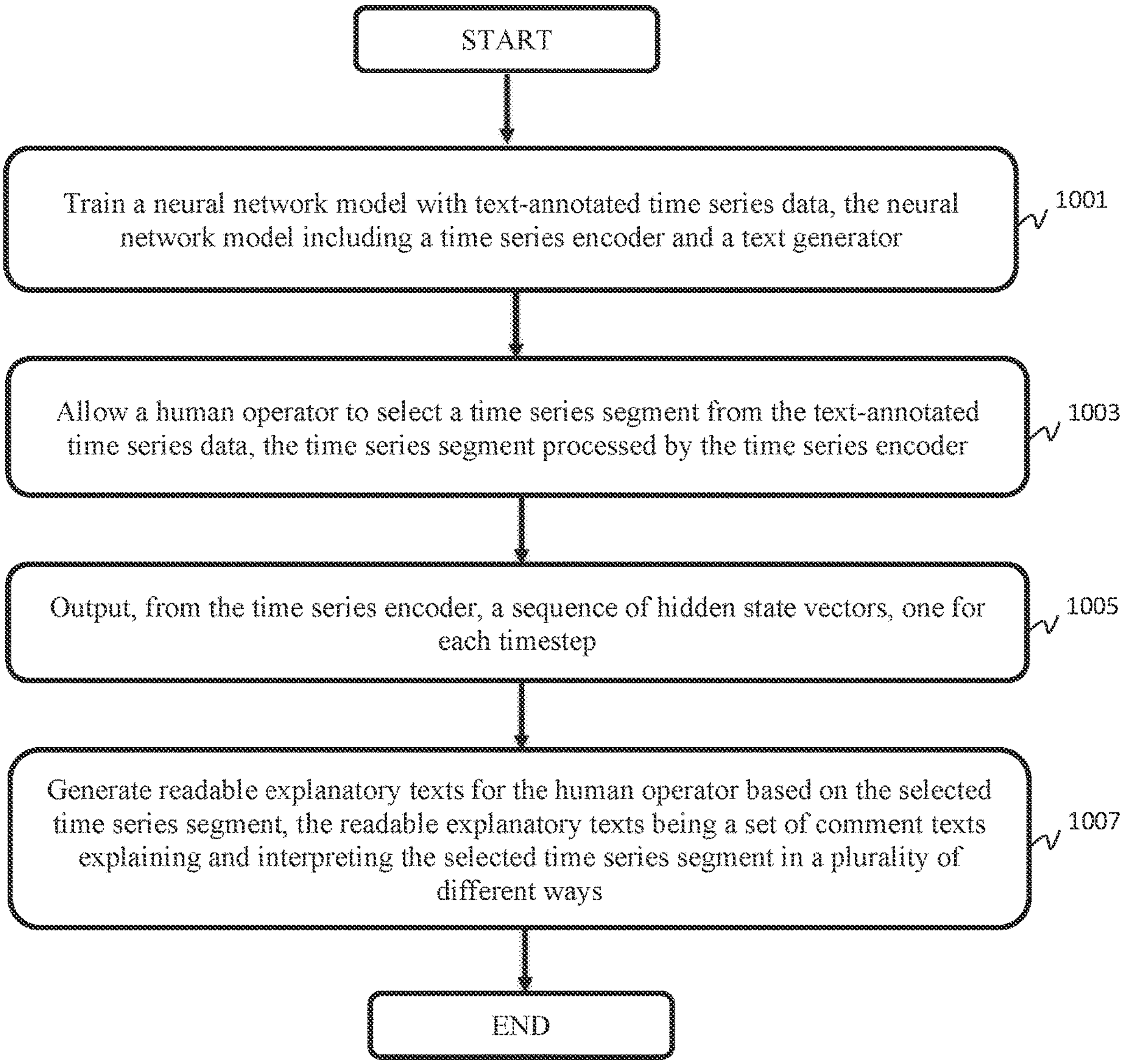
FIG. 9 is a block/flow diagram of an exemplary method for explaining sensor time series data in natural language, in accordance with embodiments of the present invention.

FIG. 9 is a block/flow diagram of an exemplary method for explaining sensor time series in natural language, in accordance with embodiments of the present invention.

At block 1001, train a neural network model with text-annotated time series data, the neural network model including a time series encoder and a text generator.

At block 1003, allow a human operator to select a time series segment from the text-annotated time series data, the time series segment processed by the time series encoder.

At block 1005, output, from the time series encoder, a sequence of hidden state vectors, one for each timestep At block 1007, generate readable explanatory texts for the human operator based on the selected time series segment, the readable explanatory texts being a set of comment texts explaining and interpreting the selected time series segment in a plurality of different ways.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for explaining sensor time series data in natural language, the method comprising:

training a neural network model with text-annotated time series data in a first natural language, the neural network model including a time series encoder and a text generator, the training of the neural network model includes back-translating text into a second natural language different than the first natural language, to generate new data pairs;

allowing a human operator to select a time series segment from the text-annotated time series data, the time series segment processed by the time series encoder;

outputting, from the time series encoder, a sequence of hidden state vectors, one for each timestep; and generating readable explanatory texts for the human operator based on the selected time series segment, the readable explanatory texts being a set of comment texts explaining and interpreting the selected time series segment in a plurality of different ways.

2. The method of claim 1, wherein the time series encoder is a recurrent neural network (RNN) and the text generator is a stack of transformer layers.

3. The method of claim 2, wherein the stack of transformer layers includes a cross-attention layer and a causal self-attention layer.

4. The method of claim 3, wherein the text generator receives as input a complete or partial sequence of tokens and generates a token sequence joined to form a complete text string.

5. The method of claim 3, wherein the causal self-attention layer allows visualization of an influence of previously generated tokens on subsequent generation.

6. The method of claim 3, wherein the cross-attention layer allows visualization of an influence of time series steps on the text generation process to improve robustness to extraneous spans in the selected time series segment.

7. The method of claim 1, wherein the training of the neural network model involves employing teacher-forcing and free-running training modes.

8. A non-transitory computer-readable storage medium comprising a computer-readable program for explaining sensor time series data in natural language, wherein the computer-readable program when executed on a computer causes the computer to perform the steps of:

training a neural network model with text-annotated time series data in a first natural language, the neural network model including a time series encoder and a text generator, the training of the neural network model includes back-translating text into a second natural language different than the first natural language, to generate new data pairs;

allowing a human operator to select a time series segment from the text-annotated time series data, the time series segment processed by the time series encoder;

outputting, from the time series encoder, a sequence of hidden state vectors, one for each timestep; and generating readable explanatory texts for the human operator based on the selected time series segment, the readable explanatory texts being a set of comment texts explaining and interpreting the selected time series segment in a plurality of different ways.

9. The non-transitory computer-readable storage medium of claim 8, wherein the time series encoder is a recurrent neural network (RNN) and the text generator is a stack of transformer layers.

10. The non-transitory computer-readable storage medium of claim 9, wherein the stack of transformer layers includes a cross-attention layer and a causal self-attention layer.

11. The non-transitory computer-readable storage medium of claim 10, wherein the text generator receives as input a complete or partial sequence of tokens and generates a token sequence joined to form a complete text string.

12. The non-transitory computer-readable storage medium of claim 10, wherein the causal self-attention layer allows visualization of an influence of previously generated tokens on subsequent generation.

13. The non-transitory computer-readable storage medium of claim 10, wherein the cross-attention layer allows visualization of an influence of time series steps on the text generation process to improve robustness to extraneous spans in the selected time series segment.

14. The non-transitory computer-readable storage medium of claim 8, wherein the training of the neural network model involves employing teacher-forcing and free-running training modes.

15. A system for explaining sensor time series data in natural language, the system comprising:

a memory; and one or more processors in communication with the memory configured to:

train a neural network model with text-annotated time series data in a first natural language, the neural network model including a time series encoder and a text generator, the training of the neural network model includes back-translating text into a second natural language different than the first natural language, to generate new data pairs;

allow a human operator to select a time series segment from the text-annotated time series data, the time series segment processed by the time series encoder;

output, from the time series encoder, a sequence of hidden state vectors, one for each timestep; and generate readable explanatory texts for the human operator based on the selected time series segment, the readable explanatory texts being a set of comment texts explaining and interpreting the selected time series segment in a plurality of different ways.

16. The system of claim 15, wherein the time series encoder is a recurrent neural network (RNN) and the text generator is a stack of transformer layers.

17. The system of claim 16, wherein the stack of transformer layers includes a cross-attention layer and a causal self-attention layer.

18. The system of claim 17, wherein the text generator receives as input a complete or partial sequence of tokens and generates a token sequence joined to form a complete text string.

19. The system of claim 17, wherein the causal self-attention layer allows visualization of an influence of previously generated tokens on subsequent generation.

20. The system of claim 17, wherein the cross-attention layer allows visualization of an influence of time series steps on the text generation process to improve robustness to extraneous spans in the selected time series segment.

* * * * *